United States Patent
Aguinsatan et al.

(10) Patent No.: US 12,498,262 B2
(45) Date of Patent: Dec. 16, 2025

(54) DIGITAL SCALE OVERLOAD PROTECTION

(71) Applicant: NCR Voyix Corporation, Atlanta, GA (US)

(72) Inventors: Errol Rojas Aguinsatan, Lapu-Lapu (PH); Ireneo Rosias Filosopo, Cebu (PH); Bobit Caballero Gaviola, Minglanilla (PH); Lorene Miras Micollar, Jr., Liloan (PH); Alexandria Calinawagan Gumadlas, Carmen (PH); Roderick Militante Indab, Guihulngan (PH)

(73) Assignee: NCR Voyix Corporation, Atlanta, GA (US)

( * ) Notice: Subject to any disclaimer, the term of this patent is extended or adjusted under 35 U.S.C. 154(b) by 242 days.

(21) Appl. No.: 18/141,181

(22) Filed: Apr. 28, 2023

(65) Prior Publication Data

US 2024/0361174 A1 Oct. 31, 2024

(51) Int. Cl.
*G01G 21/23* (2006.01)
*G01G 21/28* (2006.01)
*G01G 23/37* (2006.01)
*G07G 1/00* (2006.01)

(52) U.S. Cl.
CPC .......... *G01G 21/23* (2013.01); *G01G 21/283* (2013.01); *G01G 23/37* (2013.01); *G07G 1/0072* (2013.01)

(58) Field of Classification Search
CPC ............... G07G 1/0018; G07G 1/0072; G01G 19/4144; G01G 19/52; G01G 21/23; G01G 21/283; G01G 23/37
See application file for complete search history.

(56) References Cited

U.S. PATENT DOCUMENTS

| | | | | |
|---|---|---|---|---|
| 4,403,680 A | * | 9/1983 | Hillesheimer | B66F 17/00 187/269 |
| 5,319,161 A | * | 6/1994 | Miller | G01G 23/005 177/154 |
| 5,637,837 A | * | 6/1997 | Merz | G01G 21/22 298/17 B |
| 10,060,784 B2 | * | 8/2018 | Froehlich | G01G 21/23 |

(Continued)

FOREIGN PATENT DOCUMENTS

CN    111307261 A    *    6/2020    .............    A47B 97/00

OTHER PUBLICATIONS

Machine translation of CN-111307261-A (Year: 2020).*

*Primary Examiner* — Natalie Huls
(74) *Attorney, Agent, or Firm* — Schwegman Lundberg & Woessner, P.A.

(57) ABSTRACT

A digital scale includes a lift apparatus configured to lift a top tray of the scale off weight sensors of the scale in order to prevent any potential damage and/or malfunction of the weight sensors due to excessive weight on the tray and/or due to a sudden drop of a heavy item onto the top tray. During a transaction at a terminal, an expected weight of a scanned item and/or a current weight of existing items on the tray is used to determine whether the tray is to be lifted off the sensors by the lift apparatus before the item is placed on the tray. Once the tray is lifted off the sensors and the scanned item is placed onto the top tray, the lift apparatus may slowly lower the tray back onto the weight sensors to enable a weight measurement of the item to be recorded.

10 Claims, 9 Drawing Sheets

(56) References Cited

U.S. PATENT DOCUMENTS

| | | | |
|---|---|---|---|
| 2014/0135994 A1* | 5/2014 | Bhatt | G01G 21/23 |
| | | | 700/275 |
| 2022/0292936 A1* | 9/2022 | Saitou | G06Q 20/204 |
| 2023/0013829 A1* | 1/2023 | Wheeler | B66F 3/12 |

* cited by examiner

DIGITAL SCALE OVERLOAD PROTECTION

BACKGROUND

Transaction terminals, such as self-service terminals (SSTs), often include one or more digital scales for weighing items during transactions. For example, an SST can include a bag scale used for security checks during a transaction to ensure that the weights recorded by the scale match the expected weights for the scanned items.

Digital scales associated with SSTs can experience scale overload, which can be caused by a sudden drop of weight onto the scale and/or by exceeding a weight capacity on the scale. When such an overload occurs repeatedly over time, the weight sensors can become permanently damaged. While scales often include multiple weight sensors, damage to even a single sensor can result in all sensors having to be replaced, which is costly for retailers.

SUMMARY

In various embodiments, a digital scale, a system, and a method for digital scale overload protection are presented. The digital scale includes a lift apparatus to raise and lower a top tray of the scale off of and onto weight sensors of the scale. The apparatus is controlled to raise or lower the top tray based on transaction data associated with a transaction at a transaction terminal and/or based on a state of the terminal. With the tray in a raised position, the weight sensors are protected from both excessive weight on the scale (e.g., weight above a known weight capacity of the scale) as well as from a sudden drop on the scale of one or more items that exceed a threshold weight.

DETAILED DESCRIPTION

Bag scales, such as those provided with self-service terminals (SSTs), can be overloaded with weight, which can damage weight sensors of the scale. For example, suppose a customer suddenly drops a 50 lb. bag of dog food onto the tray of the scale. In this scenario, the force on the weight sensors is substantially more than what would have occurred had the customer placed the dog food onto the tray more gently. That is, the actual force exerted on the sensors is dependent upon both an item's weight and a height above the tray from which the item is dropped onto the tray.

As another example, suppose a scale's maximum weight capacity is 150 lbs. and existing items on the scale's tray weigh 135 lbs. Further suppose that a next item to be placed on the tray by a customer is a 30 lb. case of bottled water. In this example scenario, if the next item is placed on the tray, the weight sensors could fail because the combined weight on the tray (165 lbs.) exceeds the scale's maximum weight capacity (150 lbs.).

Furthermore, employees and customers often place things on scale trays that the scales are not designed to handle. For example, people may sit on the trays, stand on the trays, place heavy inventory boxes on the trays, etc. Additionally, during shipping and installation of the scales, workers may stand on the trays inadvertently or stack heavy boxes on the trays. Each of these scenarios can damage a weight sensor of a scale. Further, as noted earlier, when one weight sensor is damaged, generally all the weight sensors have to be replaced.

Embodiments of the technology disclosed herein provide technical solutions to the aforementioned technical problems relating to digital scale overload. In accordance with example embodiments of the disclosed technology, a digital scale includes a lift apparatus controlled by a microcontroller of the scale and/or a processor of a transaction terminal. The lift apparatus resides under the top tray of the scale. When the lift apparatus is extended, the top tray is raised above the weight sensors and locked into place such that any excess weight or sudden drop of a heavy object onto the top tray does not exert force on the weight sensors. When the lift is lowered, the underside of the top tray rests on the weight sensors permitting the weight sensors to record a weight of any object(s) placed on the tray. The microcontroller of the scale and/or processor of the terminal control when the lift apparatus is extended and when the lift apparatus is lowered onto the weight sensors.

According to example embodiments, when the terminal is in an idle state (i.e., no transactions are being processed at the terminal), the lift apparatus is extended, and the top tray is locked and extended above and off of the weight sensors. When the terminal is in a transaction state, the lift apparatus may be lowered such that the underside of the top tray rests on the weight sensors. When the digital scale is powered off, the lift apparatus may be placed in the extended position.

During a transaction, a total current weight of items on the tray of the scale is maintained and when a next scanned item for the transaction has an expected item weight that, in combination with the current weight on the scale, exceeds a total weight capacity for the scale, the lift apparatus may be extended to protect the weight sensors from overload prior to the next item being placed on the tray. In some embodiments, the terminal may instruct a consumer to remove one or more items from the scale whose weight has already been registered by the scale prior to placing the next item on the scale, thereby ensuring that the scale's maximum weight capacity is not exceeded.

In addition, when a next item scanned has an expected weight above a threshold weight known/expected to cause damage to the weight sensors if dropped from a height above the tray, the lift apparatus may also be extended. Then, after the item is placed on the tray, the lift apparatus may be slowly lowered onto the tray until the tray rests on the weight sensors such that the item's weight can be recorded for the transaction.

Figure 1A:
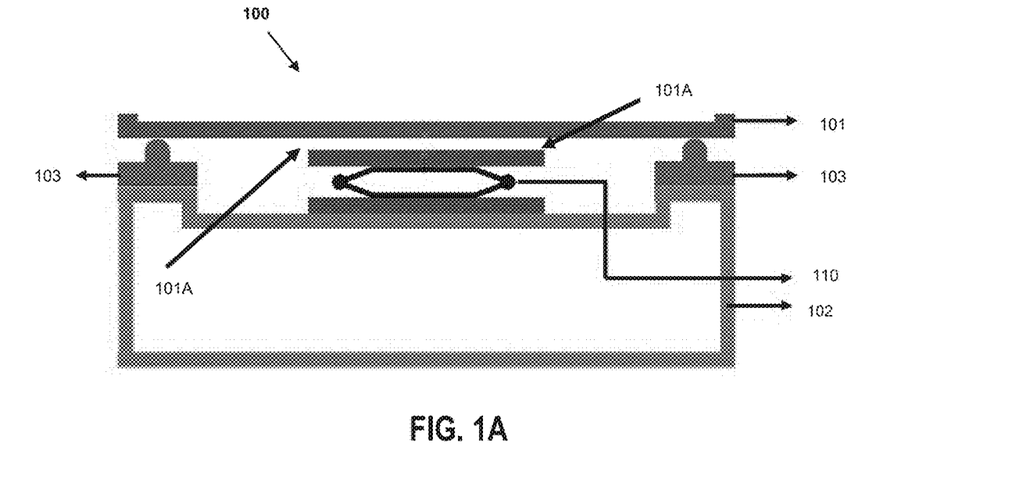
FIG. 1A is a diagram of a digital scale in a lowered position with a lift apparatus situated under a top tray of the scale, according to an example embodiment.

FIG. 1A is a diagram of a digital scale 100 in a lowered position with a lift apparatus 110 situated under a top tray 101 of the scale 100, according to an example embodiment. It is to be noted that the components are shown schematically in greatly simplified form, with only those components relevant to understanding of the embodiments being illustrated.

The digital scale includes a top tray 101, a scale body 102, one or more weight sensors 103, and a lift apparatus 110. Although not shown in FIG. 1A, the digital scale further includes one or more microcontrollers 120 (shown in FIG. 5), an analog to digital converter (ADC) 130 (shown in FIG. 5), and a lift apparatus motor 111 (shown in FIGS. 4 and 5).

FIG. 1A shows the lift apparatus 110 in a lowered position. A gap 101A exists between an underside surface of top tray 101 and a top surface of lift apparatus 110. In this state or position, the underside surface of tray 101 rests on top of weight sensors 103. This scale state allows the weight of any objects/items resting on a top surface of tray 101 to be captured by sensors 130, converted from analog information to digital information by ADC 130, and recorded and/or reported by microcontroller(s) 120.

Figure 1B:
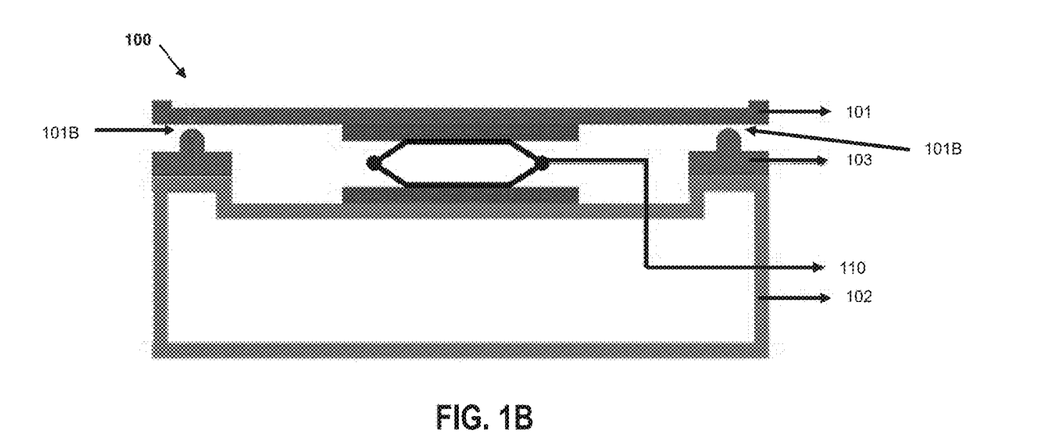
FIG. 1B is a diagram of a digital scale in a raised position with the lift apparatus extended to raise the tray above weight sensors of the scale, according to an example embodiment.

FIG. 1B is a diagram of a digital scale 100 in a raised or extended position with the lift apparatus 110 extended to elevate the tray 101 above weight sensors 103 of the scale 100, according to an example embodiment. Gaps 101B are visible in FIG. 1B between an underside surface of tray 101 and a top surface of sensors 103. The underside surface of tray 101 rests upon and is supported by a top surface of lift apparatus 110. Lift apparatus 110 locks into this extended position such that when weight is placed on tray 101, the underside surface of tray 101 does not extend down onto the top surface of sensors 103. This provides the scale with weight overload protection ensuring that sensors 103 are not damaged by an excessive force or weight placed tray 101 when the lift apparatus 110 is extended and locked.

Figure 2:
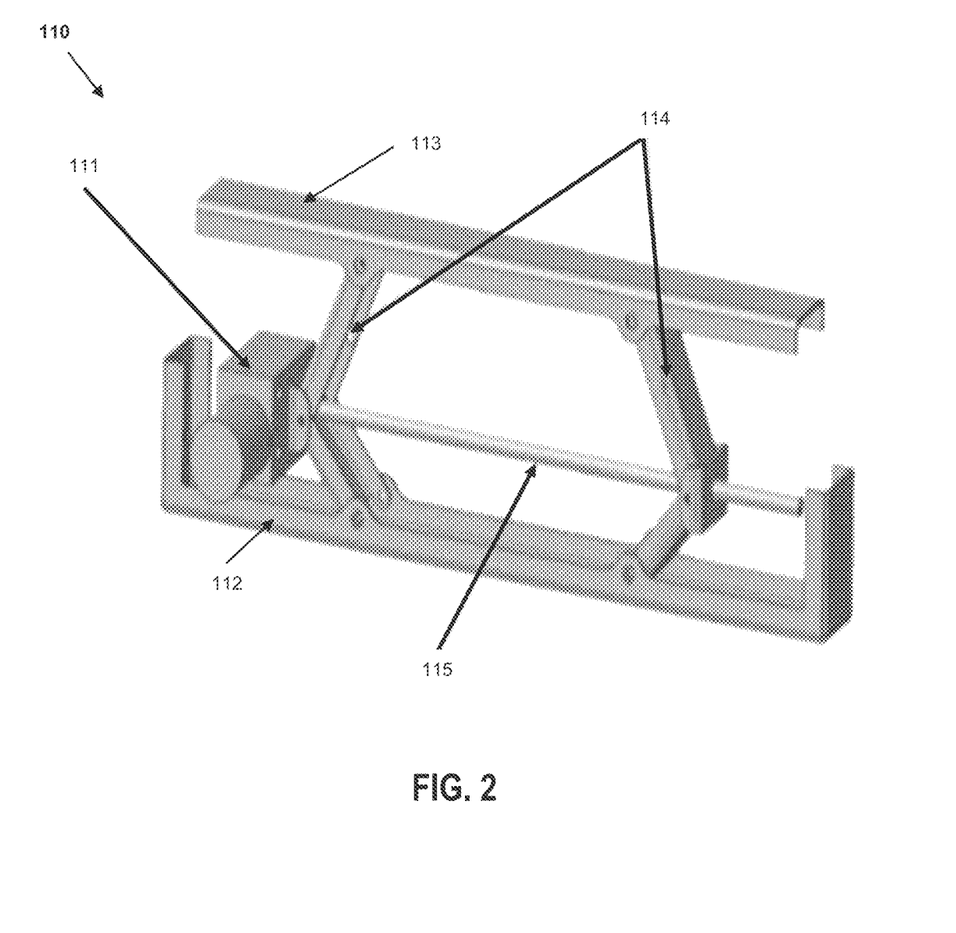
FIG. 2 is a diagram of a lift apparatus for the scale, according to an example embodiment.

FIG. 2 is a diagram of a particular implementation of the lift apparatus 110, according to an example embodiment. Apparatus 110 includes a motor 111, a base 112, a top surface platform 113, scissor lift 114, and a structural support brace 115. The motor 111 when activated by microcontroller 120 raises and lowers the scissor lift 114. The top surface platform 113 includes a horizontal surface that engages with and lifts the underside surface of tray 101 when the apparatus 110 is in the extended or raised position. In the extended position, scissor lift 114 and support brace 115 are locked into place to maintain the extended position when excessive weight or force is applied downward from tray 101.

Figure 3:
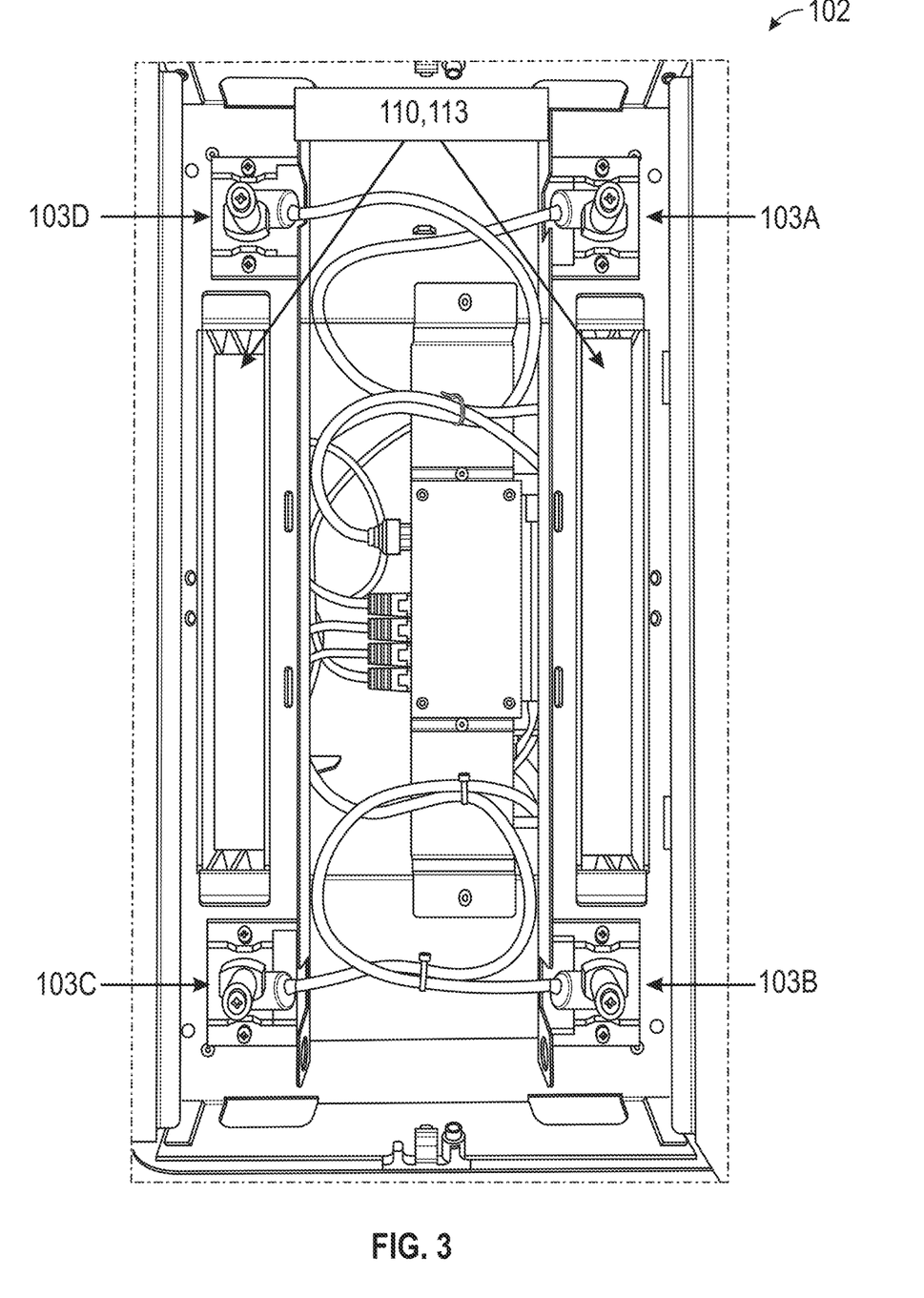
FIG. 3 is a diagram of top-down view of the scale's body with the top tray removed and the weight sensors of the scale visible, according to an example embodiment.

FIG. 3 is a diagram of top-down view of the scale's body 102 with the top tray 101 removed and the weight sensors 103 of the scale 100 visible, according to an example embodiment. FIG. 3 illustrates an embodiment that comprises two lift apparatuses 110 on sides of body 102 with the top surface platforms 113 visible. In this embodiment, four weight sensors 103A, 103B, 103C, and 103D are provided. Each sensor 103A-103D is positioned at a respective corner of body 102 to engage corresponding underside surface corners of tray 101 when the lift apparatuses are in a lowered position.

Figure 4:
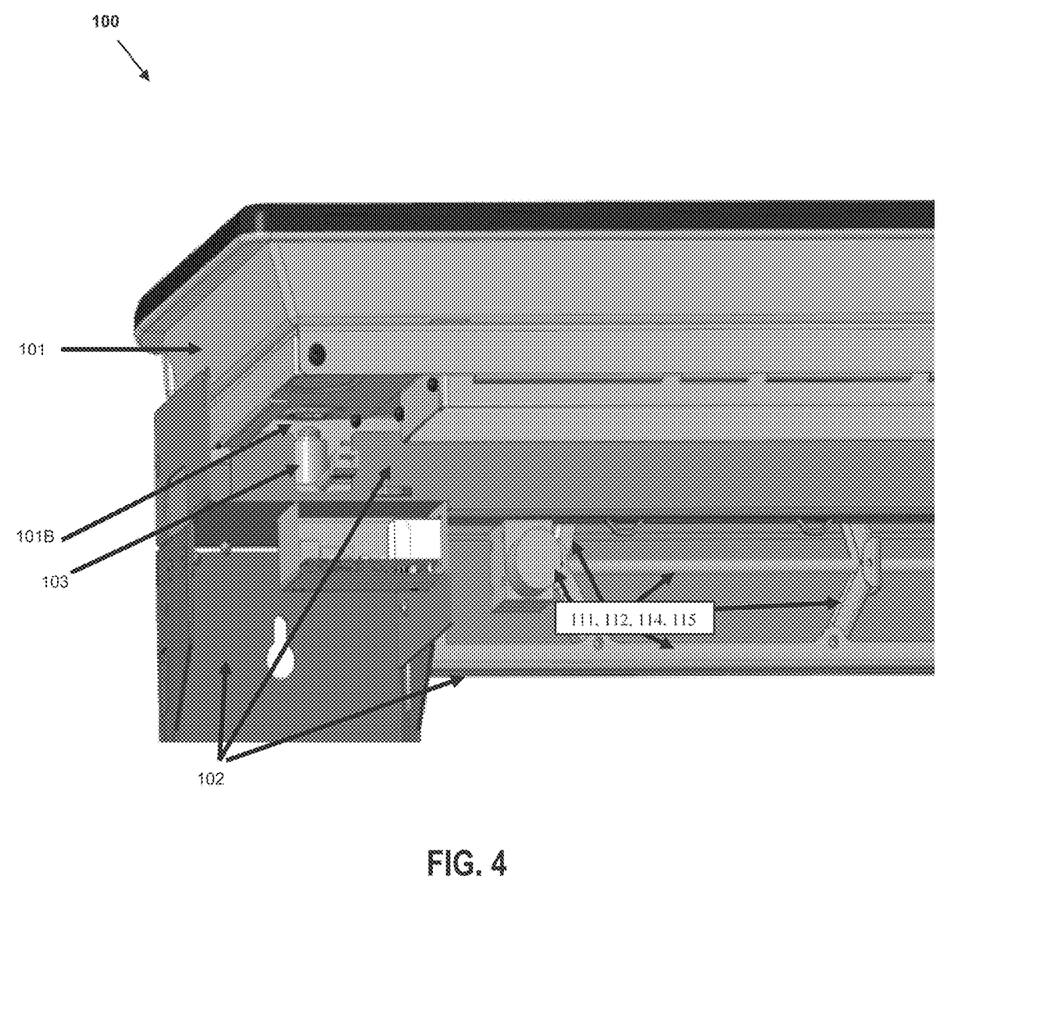
FIG. 4 is diagram of a cross-section and side view of the scale's body with the top tray raised above the weight sensors and the lift apparatus extended, according to an example embodiment.

FIG. 4 is diagram of a cross-section and side view of a scale 100 with the top tray 101 elevated above the weight sensors 103 as a result of the lift apparatus 110 being extended, according to an example embodiment. One weight sensor 103 is visible in the cross-sectional view. Moreover, motor 111, base 112, scissor lift 114, and structural support bar 115 of the lift apparatus 110 are also visible. Gap 101B is present between an underside surface of tray 101 and the weight sensor 103 due to the tray 101 being raised above and off of sensor 103 as a result of lift apparatus 110 being in an extended position. The top surface platform 113 of lift apparatus 110 is not visible in FIG. 4 as the top surface platform 113 has engaged the underside surface of tray 101 to elevate, hold, and lock tray 101 above and off of sensor 103.

Figure 5:
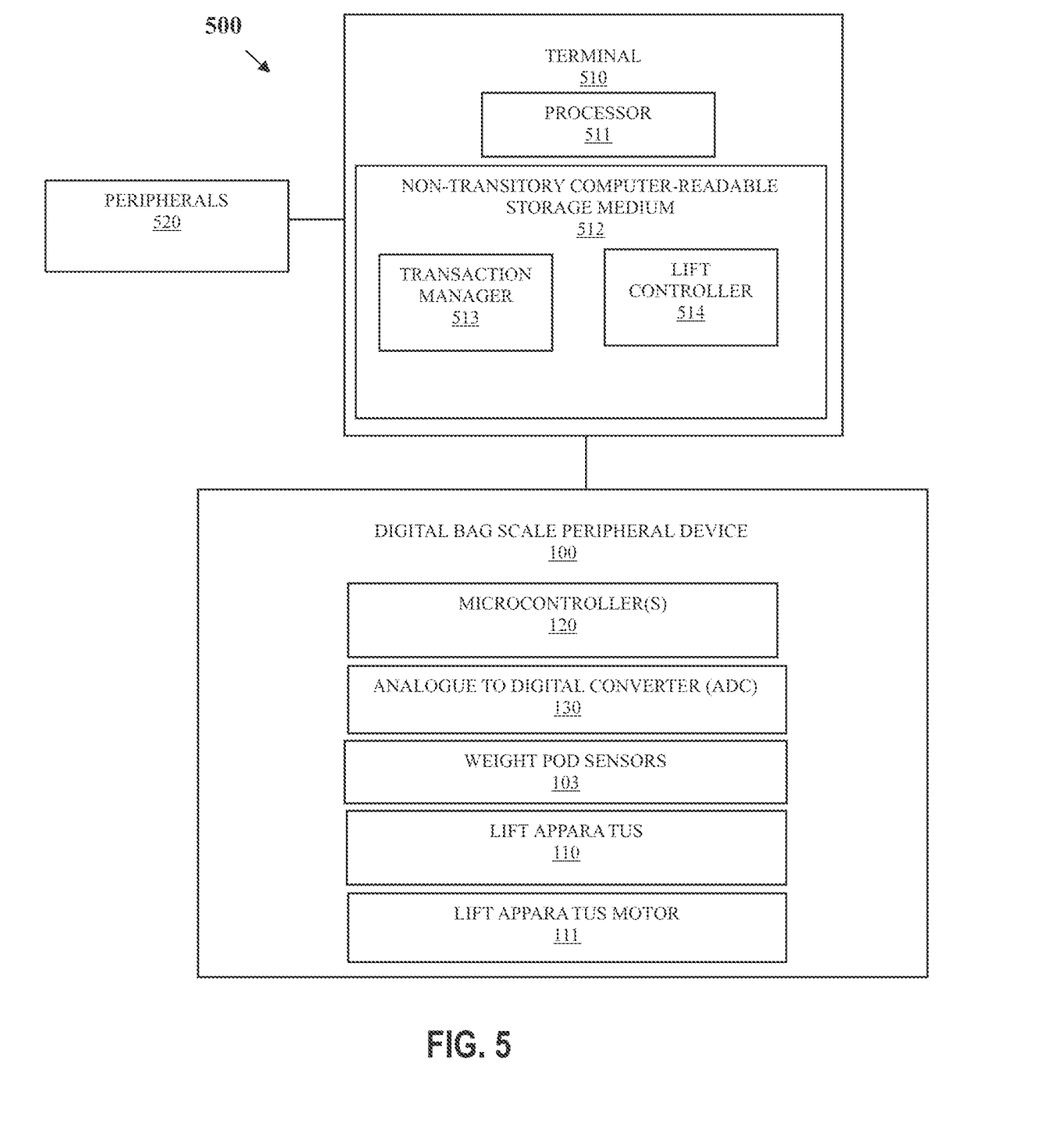
FIG. 5 is a block diagram of a system for digital scale overload protection, according to an example embodiment.

FIG. 5 is a block diagram of a system 500 for digital scale overload protection, according to an example embodiment. It is to be noted that the components are shown schematically in greatly simplified form, with only those components relevant to understanding of the embodiments being illustrated. Furthermore, the various components illustrated in FIG. 5 and their arrangement are presented for purposes of illustration only, and it should be noted that other arrangements with more or less components are possible without departing from the teachings of scale overload protection presented herein and below.

The system 500 includes a transaction terminal 510, peripherals 520 of terminal 510, and a digital bag scale peripheral device 100. The terminal 510 includes a processor 511 and a non-transitory computer-readable storage medium (hereinafter "medium") 512, which includes computer-executable instructions for a transaction manager 513 and a lift controller 514. The instructions when executed by processor 511 cause the processor 511 to perform operations discussed herein and below with respect to 513 and 514.

Peripherals 520, include by way of example only, a touch display, a media deposit/dispense device, a media recycler, a card reader, a printer, a bioptic scanner, a handheld scanner, a vertical scanner, a horizontal scanner, a combined scanner and produce weigh scale device, a near-field communication (NFC) transceiver, a wireless transceiver, a coin depositor/dispenser device, a camera, a microphone, etc. It is noted that other peripherals can also be interfaced to terminal 510 for transaction processing beyond those listed above.

The digital bag scale peripheral device 100 includes the components described above with respect to FIGS. 1A and 1B as well as one or more microcontrollers 120, an ADC 130, weight pod sensors 103, lift apparatus 110, and lift apparatus motor 111. Microcontroller 120 provides manager 513 with digital weights for items placed on tray 101 during a transaction. The weights are processed to ensure that each item scanned by a customer is subsequently placed on tray 101. Manager 513 maintains a correlation between an expected weight for the item and the actual recorded weight reported by microcontroller 120. When the weight of any given item or collection of items recorded by the scale and reported by the microcontroller 120 during the transaction does not agree with the expected weight, manager 513 issues an alert and/or interrupts the transaction for an audit (e.g., a store attendant intervention) to determine whether the mismatch is due to inadvertent customer error or attempted theft.

Microcontroller 120 and/or lift controller 514 provide weight overload protection to weight sensors 103 of scale 100 both during transactions as well as when the transaction terminal is idle (i.e., when no transactions are taking place on terminal 510). The weight overload protection may be based on a state of terminal 510. For instance, when terminal 510 is in an idle state, lift controller 514 and/or microcontroller 120 may activate motor 111 and cause lift apparatus 110 to extend tray 101 above a top surface and off of weight sensors 103. Apparatus 110 may lock into the extended or raised position requiring motor 111 to be activated to cause apparatus 110 to unlock and be lowered out of the extended position. This mechanism ensures that any heavy item placed onto tray 101 or any individual who sits, stands, or rests against tray 101 cannot cause damage to weight sensors 103.

In an embodiment, when scale 100 is powered off, microcontroller 120 as part of a scale shutdown process moves apparatus 110 into an extended and locked position. Thus, if the scale 100 is moved and transported for use at a different terminal 510, the weight sensors 103 are in a protected state or condition until the scale is powered on and a transaction state is detected for terminal 510.

During a transaction state for terminal 510, microcontroller 120 and/or controller 514 monitor both the known weight of a most recently scanned item at terminal 510 along with a current weight of previously scanned items for the transaction which have already been placed on tray 101 of scale 100. When a recently scanned item is above a threshold weight such that if the item is dropped from a height onto the scale 100, the force exerted by the weight of the item can cause damage to sensors 103, the apparatus 110 may be moved to the extended and locked position until the item is placed on the tray 101. Once the item is placed on tray 101, apparatus 110 may be slowly lowered at a controlled rate of speed allowing the underside of tray 101 to come into contact with a top surface of sensors 103 such that the weight of tray 101 is supported by and rests on sensors 103 and the top surface platform 113 is no longer in contact with the underside surface of tray 101. When the expected weight of a recently scanned item combined with the current weight of items already on tray 101 exceeds a weight capacity for the sensors 103, the apparatus 110 may be raised to the extended position to protect sensors 101 from a combined weight that exceeds the sensors' weight capacity. A consumer may be instructed to move one or more items from the tray 101 whose weight has already been recorded and confirmed to match an expected weight, thereby allowing the most recently scanned item to be placed on the tray 101 without exceeding the weight capacity of the sensors 103.

Figure 6A:
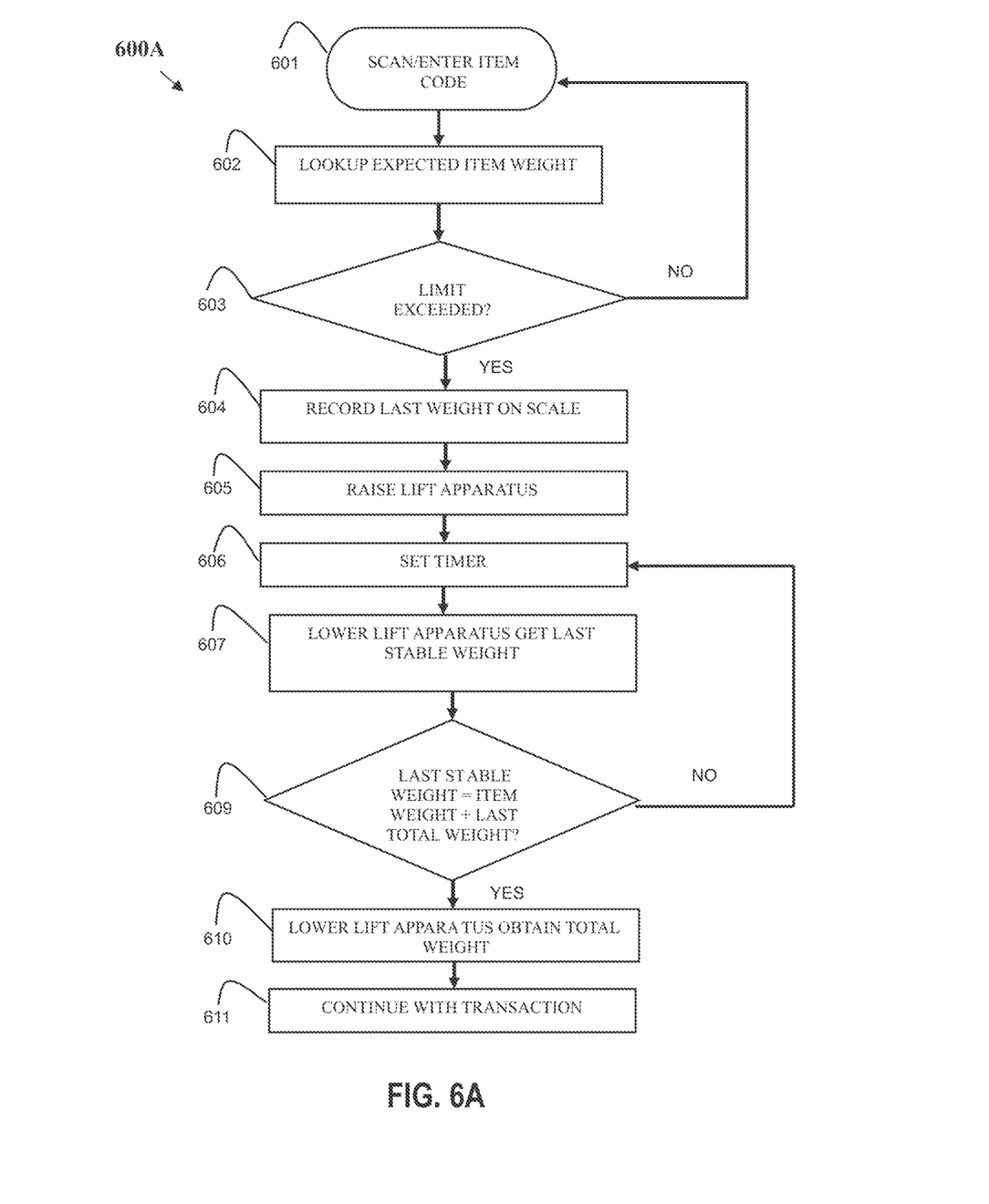
FIG. 6A is a flow diagram of a method for providing digital scale overload protection based on a scanned item's expected weight before the scanned item is placed on the scale during a transaction, according to an example embodiment.

The aforementioned different states of terminal 510 are now discussed in greater detail with reference to FIGS. 6A-6C and 7. FIG. 6A is a flow diagram of a method 600A for providing digital scale overload protection based on a scanned item's expected weight before the scanned item is placed on the scale 100 during a transaction at a terminal 510, according to an example embodiment. The method 600A is implemented as firmware or software instructions executed by microcontrollers 120 and/or executed by processor 511 operating as lift controller 514.

At 601, an item is reported as scanned during a transaction at a terminal 510. This indicates that terminal 510 was already in a transaction state or was just moved from an idle state to the transaction state based on the scanning of the item.

At 602, the item code for the scanned item is looked up in a store data base or table. The item code is stored in association with an expected weight for the item. At 603, a check is made to see if the expected item weight for the scanned item exceeds a first threshold weight. The first threshold weight may be set to a value determined to be likely to cause damage to the sensors 103 if an item having that weight is dropped from a distance rather than being placed onto tray 101. If the expected weight for the scanned item does not exceed the first threshold weight, then the item may be placed on the tray 101 by the customer associated with the transaction and the method 600A resumes with respect to the next item scanned during the transaction, assuming there are one or more items remaining to be scanned.

If the expected weight of the item exceeds the first threshold weight, at 604, the last weight recorded on the scale is saved or noted. This is the weight of any items already on tray 101 before the scanned item is placed on tray 101.

At 605, microcontroller 120 and/or lift controller 514 cause motor 111 to activate lift apparatus 110 to move to an extended and locked position. In this position, tray 101 is elevated above sensors 103 and locked from further movement by virtue of apparatus 110 being in an extended and locked position.

At 606, a timer is set, e.g., 5 seconds. The timer is configured to give the customer adequate time to place the scanned item onto the tray 101. At 607, microcontroller 120 and/or lift controller 514 cause motor 111 to activate and move apparatus 110 in a controller manner into a lowered position, thereby causing an underside of tray 101 to be lowered into a resting position on sensors 103.

At 609, and after the timer expires, a determination is made as to whether the scanned item was placed on tray 101 or not based on the last recorded weight at 604. When the item was not placed on the tray 101 by the customer, the method returns to 606, where the timer is reset, and the method proceeds iteratively in this fashion until the last weight recorded is not equal to the current weight on the tray 101. At the conclusion of each timer period, apparatus 110 is moved to the extended or raised and locked position.

Once it is determined at 609 that the last recorded weight is less than the current weight on the tray 101, the apparatus 110 is lowered to the non-extended position in which tray 101 rests on weight sensors 103, at 610. A total weight for the scanned item and any other items on tray 101 is then recorded. The transaction then continues at 611—either iteratively from 601 with a next scanned item or, if no items remain to be scanned, with payment processing for the transaction by the customer through manager 513 of terminal 510.

Figure 6B:
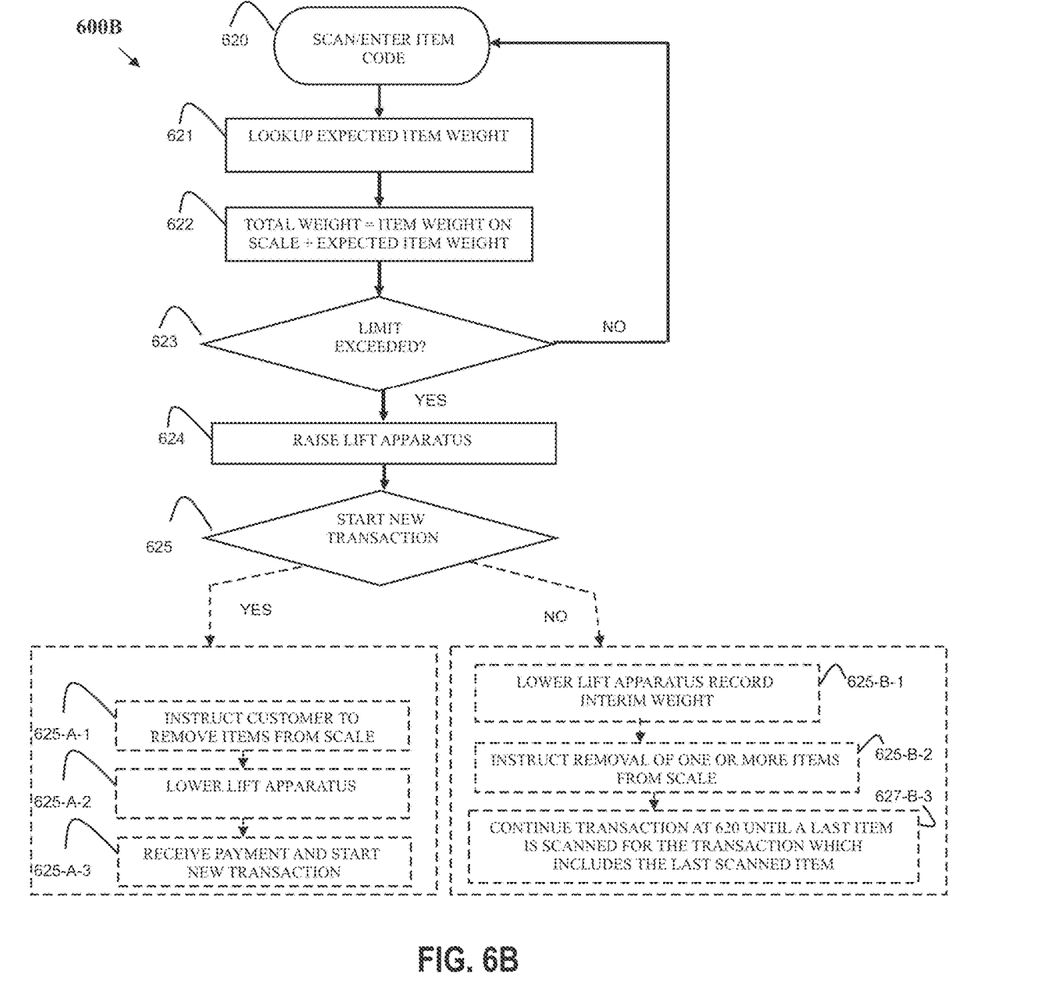
FIG. 6B is a flow diagram of a method for providing digital scale overload protection to ensure that an expected weight of each item scanned for a transaction plus a combined weight of existing items on the digital scale do not exceed a weight capacity of the scale before the scanned item(s) are placed on the scale during the transaction, according to an example embodiment.

FIG. 6B is a flow diagram of a method 600B for providing digital scale overload protection to ensure that an expected weight of each item scanned for a transaction plus a combined weight of existing items on the digital scale 100 do not exceed a weight capacity of the scale 100 before the scanned item is placed on the scale 100 during the transaction at the terminal 510, according to an example embodiment. Again, the method 600B is implemented as firmware or software instructions executed by microcontrollers 120 and/or executed by processor 511 operating as lift controller 514.

At 620, a scanned item is reported for a transaction at terminal 510. Again, this can be a start of a transaction after the terminal was originally in an idle state or can be during an existing transaction which is actively being processed by manager 513.

At 621, an item code read from scanning a barcode or the like on the item's packaging is used to obtain an expected item weight for the scanned item. At 622, a total weight is calculated as the sum of a current item weight for any current items on tray 101 and the expected item weight for the scanned item. At 623, a determination is made as to whether the total calculated weight exceeds a second threshold weight corresponding to a weight capacity for the sensors 103. If the total combined weight would not exceed the weight capacity, the transaction iterates back to 620 for a next scanned item, if any, for the transaction.

If the total calculated weight exceeds a threshold weight capacity for the sensors 103, the apparatus 110 is raised, extended, and locked, at 624. Accordingly, the underside of tray 101 is moved off of and above a top surface of sensors 103 and is supported and rests on the top surface platform 113 of apparatus 110.

At 625, the customer is asked whether they wish to start a new transaction. Assuming the customer does wish to start a new transaction for the scanned item that was not yet placed on tray 101, at 625-A-1, the customer is instructed to remove the items from the scale 100. At 625-A-2, the lift apparatus 110 is lowered such that the underside surface of tray 101 rests on the sensors 103. At 625-A-3, payment is received from the customer and the customer scans the last scan item again at 620 for a start of a new transaction.

When the customer, at 625, elects not to start a new transaction, the lift apparatus 110 is lowered at 625-B-1. At 625-B-2, the customer is instructed to remove one or more items from the tray 101 of scale 100 so that the total weight on the scale 100 will not exceed the threshold limit when the scanned item is placed onto the tray 101 of the scale 100. In an embodiment, the heaviest current recorded item weight for a heaviest item is identified for the customer and the customer is asked to remove that item. In an embodiment, the customer is asked to remove all the current items. In an embodiment, the customer is asked to remove two or more of the items but less than all of the items. At 625-B-3, the transaction continues at 620 until a last item is scanned for the transaction and the transaction includes the last scanned item.

Figure 6C:
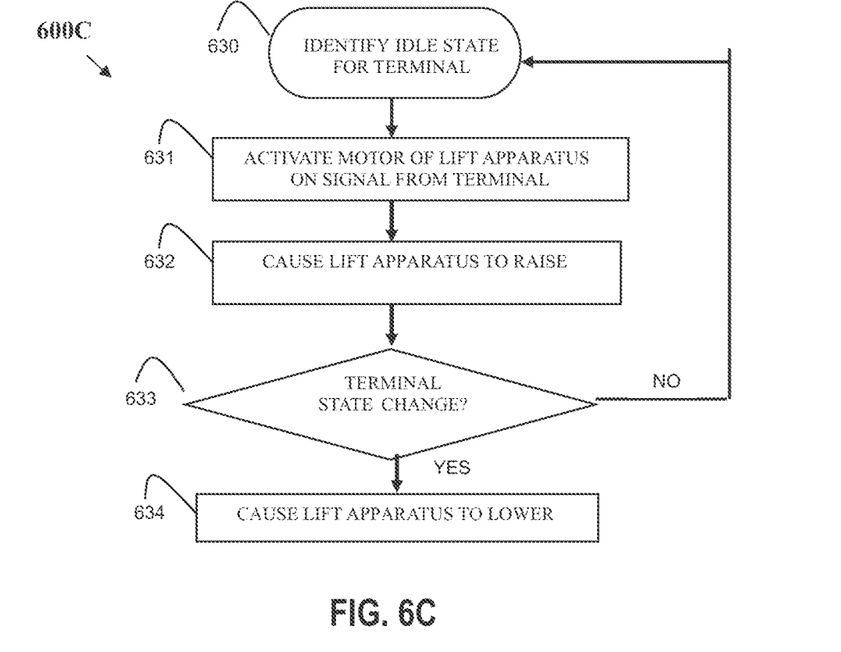
FIG. 6C is a flow diagram of a method for providing digital scale overload protection based on a state of a terminal associated with the scale, according to an example embodiment.

FIG. 6C is a flow diagram of a method 600C for providing digital scale overload protection based on a state of a terminal 510 associated with the scale 100, according to an example embodiment. Manager 513 reports that a state for the terminal is idle, at 630, indicating that there are no transactions being processed on terminal 510. Responsive to this idle state, microcontrollers 120 and/or lift controller 514 activate motor 111 of lift apparatus 110 based on a signal received from terminal 510, thereby causing, at 632, lift apparatus 110 to be raised to the extended, raised, and locked position where the weight sensors 103 are not in contact with the tray 101 and thus protected from any weight placed on tray 101 as long as terminal 510 remains in the idle state.

At 633, the terminal state is continuously monitored for a state change reported by manager 513. At 634, when the state changes from an idle state to a transaction state, apparatus 110 is lowered causing an underside of tray 101 to rest on sensors 103 to again enable recording of item weights. In an embodiment, if the scale 100 were to lose power either through a power failure or through a controlled shutdown of terminal 510 and its peripherals 520 and 100, apparatus 110 would remain in the extended, raised, and locked position.

Figure 7:
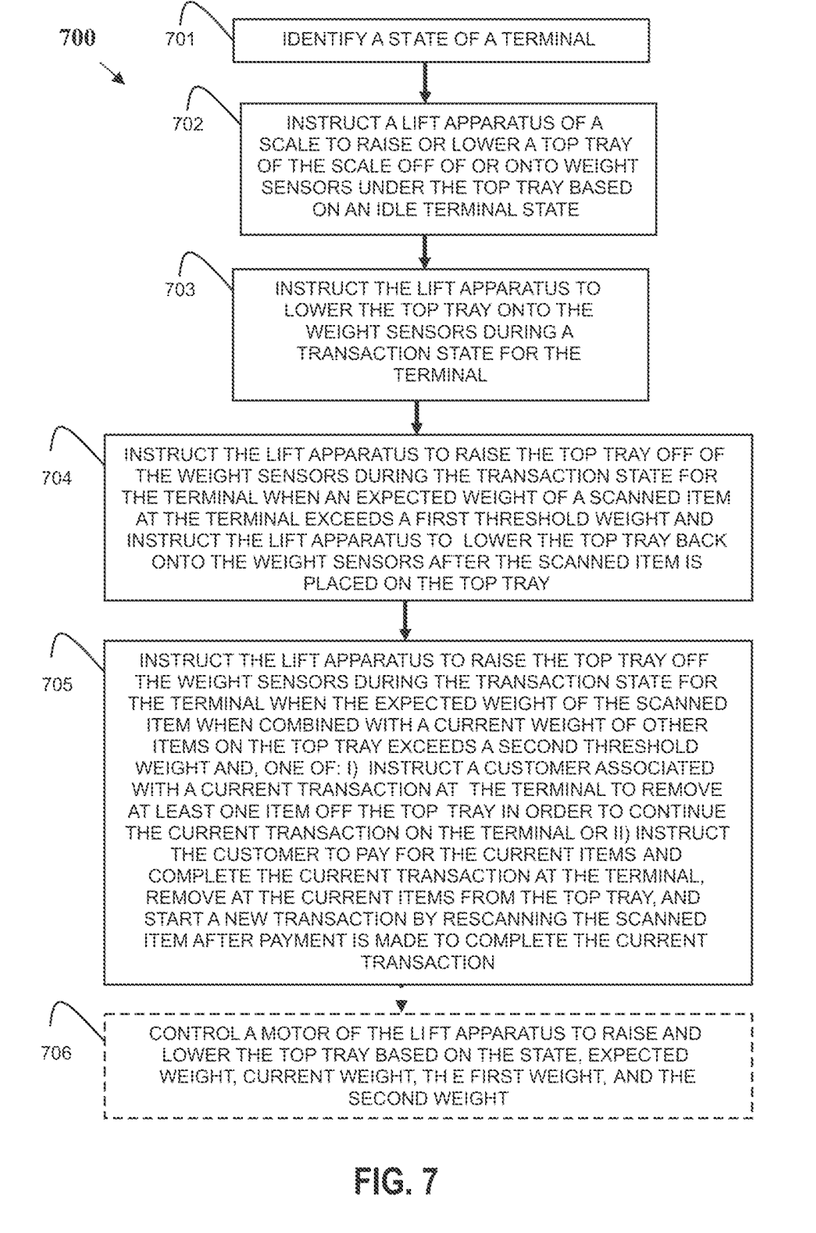
FIG. 7 is a flow diagram of a method for providing digital scale overload protection, according to an example embodiment.

FIG. 7 is a flow diagram of a method 700 for providing digital scale overload protection, according to an example embodiment. The method is implemented as software and/or firmware instructions. The instructions are referred to as a "controller." The controller is executed by processor 511 and/or one or more microcontrollers 120 of scale 100.

At 701, controller, identifies a state of a terminal. The state can include an idle state, a transaction state, an administrative state, or a shutdown state.

At 702, the controller instructs a lift apparatus 110 of a scale 100 to raise or lower a top tray 101 of the scale 100 off of or onto weight sensors 103 under the top tray 101 of scale 100 based on an idle state being reported for the terminal. In an embodiment, the method 600C is the processed by the controller.

At 703, the controller instructs the lift apparatus 110 to lower the top tray 101 onto weight sensors 103 during a transaction state for the terminal 510. In an embodiment, the methods 600A and 600B are then processed by the controller.

At 704, the controller instructs the lift apparatus 110 to raise the top tray 101 off of the weight sensors 103 during a transaction state for terminal 510. This occurs when an expected weight of a scanned item at the terminal 510 exceeds a first threshold weight. The controller further instructs lift apparatus 110 to lower the top tray 101 back onto weight sensors 103 after the scanned item is placed on top tray 101 by a customer associated with the corresponding transaction at terminal 510.

At 705, the controller instructs the lift apparatus 110 to raise the top tray 101 off the weight sensors 101 during the transaction state for the terminal 510. This occurs when the expected item weight of the scanned item in combination with a current weight of existing items on the top tray 101 exceeds a second threshold weight. In an embodiment, the customer is asked to finalize and pay for the current transaction at the terminal, remove the current items from the tray 101, and start a new transaction by scanning the previously scanned item. In another embodiment, the customer is asked to at least one item off the tray 101 and then place the scanned item on the tray 101 for purposes of continuing the transaction with the corresponding item(s) cleared/removed from tray 101 and only the scanned item placed on tray 101. In an embodiment of the last embodiment, manager 513 identifies the heaviest item of the current items currently on the tray 101 and instructs the customer to remove that item from tray 101 before placing the scanned item on the tray 101. In an embodiment, a transaction interface associated with manager 513 permits the customer to make the decision as to whether a new transaction is stated for the scanned item or whether a new transaction is initiated for the scanned item.

In an embodiment, at 706, the controller controls a motor 111 of the lift apparatus 110 to raise and lower the top tray 101 based on the transaction state, expected item weights of scanned items, the first threshold weight, and the second threshold weight. The first threshold weight may be a preconfigured weight representing a maximum weight that can be dropped onto the tray 101 without causing potential damage to the sensors 103. The second threshold weight may be a preconfigured weight representing a manufacturer's maximum weight capacity weight that sensors 103 are equipped to handle such that when the weight capacity is reached, the manufacturer does not guarantee that the sensors 103 will not sustain damage from a weight overload.

One now appreciates how a scale 100 with a lift apparatus 110 combined with firmware/software instructions perform overload protection for the scale 100. For conditions that could result in damage to the weight sensors 103 of the scale 100, the lift apparatus is moved to a raised, elevated, extended and locked position. In this position, the underside of the tray 101 is supported by a top surface platform 113 of apparatus 110 and the underside of tray 101 does not rest on and is elevated above a top surface of the weight sensors 103. Moreover, the movement of apparatus 110 from a raised, extended, elevated, and locked position to a lower and unlocked position is controlled such that tray 101 is slowly lowered onto and rests on sensors 103.

In an embodiment, lift apparatus 110 is a modified electromechanical jack. In an embodiment, lift apparatus 110 includes a hydraulic system to withstand substantial weights placed on top surface platform 113 when in a locked position and to control a rate of speed that scissors lift 114 raises and lowers onto and off of sensors 103. In an embodiment, the apparatus 110 moves just a few millimeters when moving from the lower position to the raised and locked position. In an embodiment, a distance that the apparatus 110 moves from the lower position to the raised and locked position is configurable.

In an embodiment, terminal 510 is a self-service terminal (SST), a point-of-sale (POS terminal, an automated teller machine (ATM), or a kiosk. In an embodiment, scale 100 is a bag security scale. In an embodiment, scale 100 is a scanner produce scale with the integrated lift apparatus 110.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A digital scale, comprising:
   a top tray;
   a body;
   weight sensors on a top portion of the body and under the top tray; and
   a lift apparatus in the body and under the top tray,
   wherein the lift apparatus is adapted to transition between a first state in which the lift apparatus is locked in a raised position in which an underside surface of the top tray is supported by a top platform of the lift apparatus and the top tray is raised off of the weight sensors and a second state in which the lift apparatus is in a lowered unlocked position in which the top platform is disengaged from the underside surface of the top tray and the underside surface of the top tray rests on top surfaces of the weight sensors.

2. The digital scale of claim 1 further comprising:
   a motor, that when activated, causes the lift apparatus to transition between the first state and the second state.

3. The digital scale of claim 1 further comprising:
   a microcontroller configured to activate and deactivate a motor based on conditions of a transaction being processed on a terminal and based on weights reported by the weight sensors.

4. The digital scale of claim 1, wherein the lift apparatus includes a scissor lift configured to raise and lower the top platform.

5. The digital scale of claim 4, wherein the lift apparatus includes a support bar extending between bottom portions of the scissor lift.

6. The digital scale of claim 5, wherein the lift apparatus is an electromechanical jack.

7. The digital scale of claim 1, wherein the lift apparatus is a first lift apparatus, the digital scale further comprising:
   a second lift apparatus located in the body, wherein the first lift apparatus is adjacent to a first side of the body and the second lift apparatus is adjacent to a second and opposing side of the body.

8. The digital scale of claim 1, wherein the digital scale is a bag scale interfaced to a transaction terminal as a peripheral device.

9. The digital scale of claim 8, wherein the transaction terminal controls raising and lowering of the lift apparatus through instructions sent to a microcontroller of the digital scale.

10. The digital scale of claim 9, wherein the transaction terminal is an automated teller machine, a self-service terminal, or a point-of-sale terminal.

\* \* \* \* \*